June 20, 1939.  S. W. SEELEY  2,163,411
REMOTE CONTROL SYSTEM
Filed Oct. 28, 1937  3 Sheets-Sheet 1

INVENTOR
STUART W. SEELEY
BY
ATTORNEY

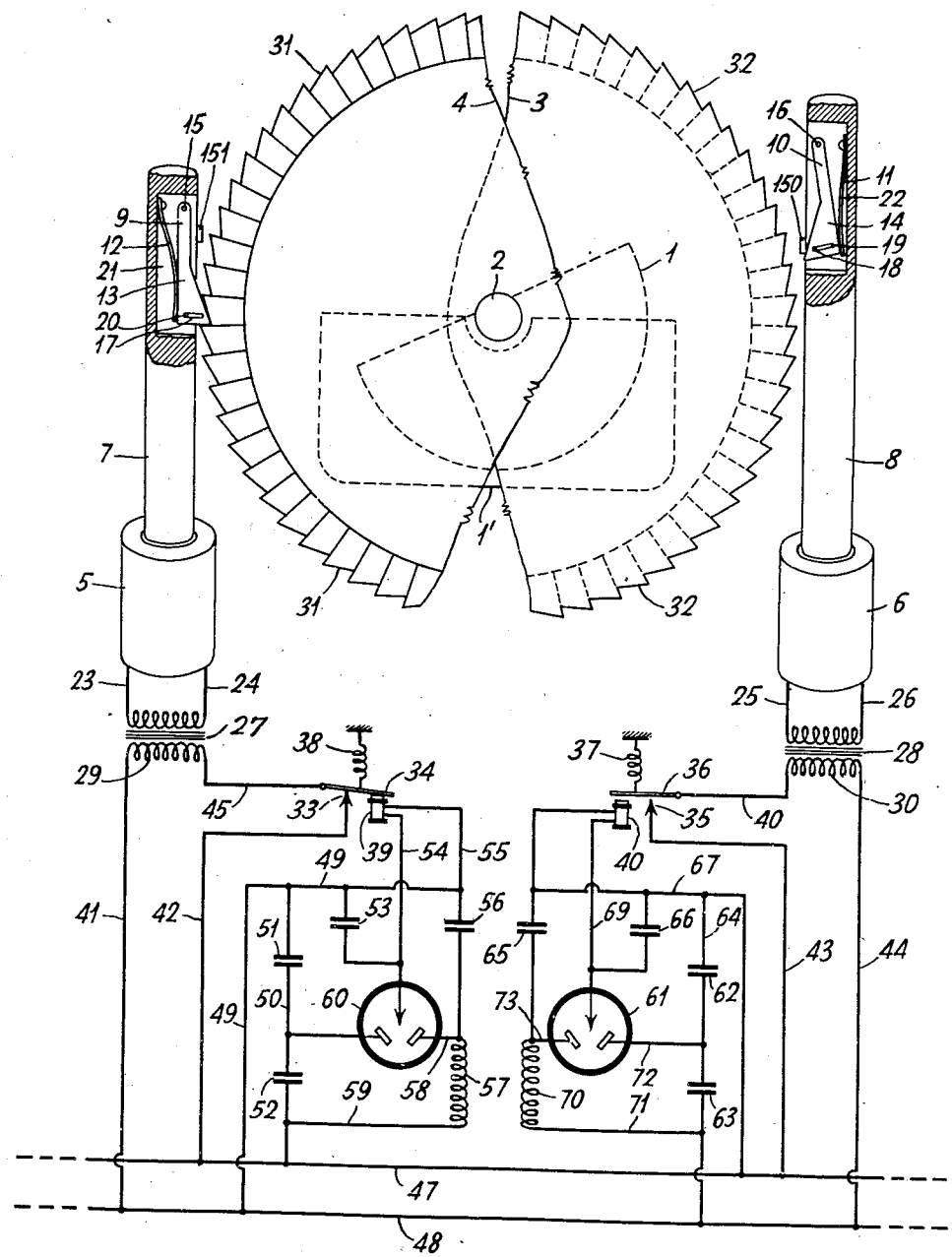

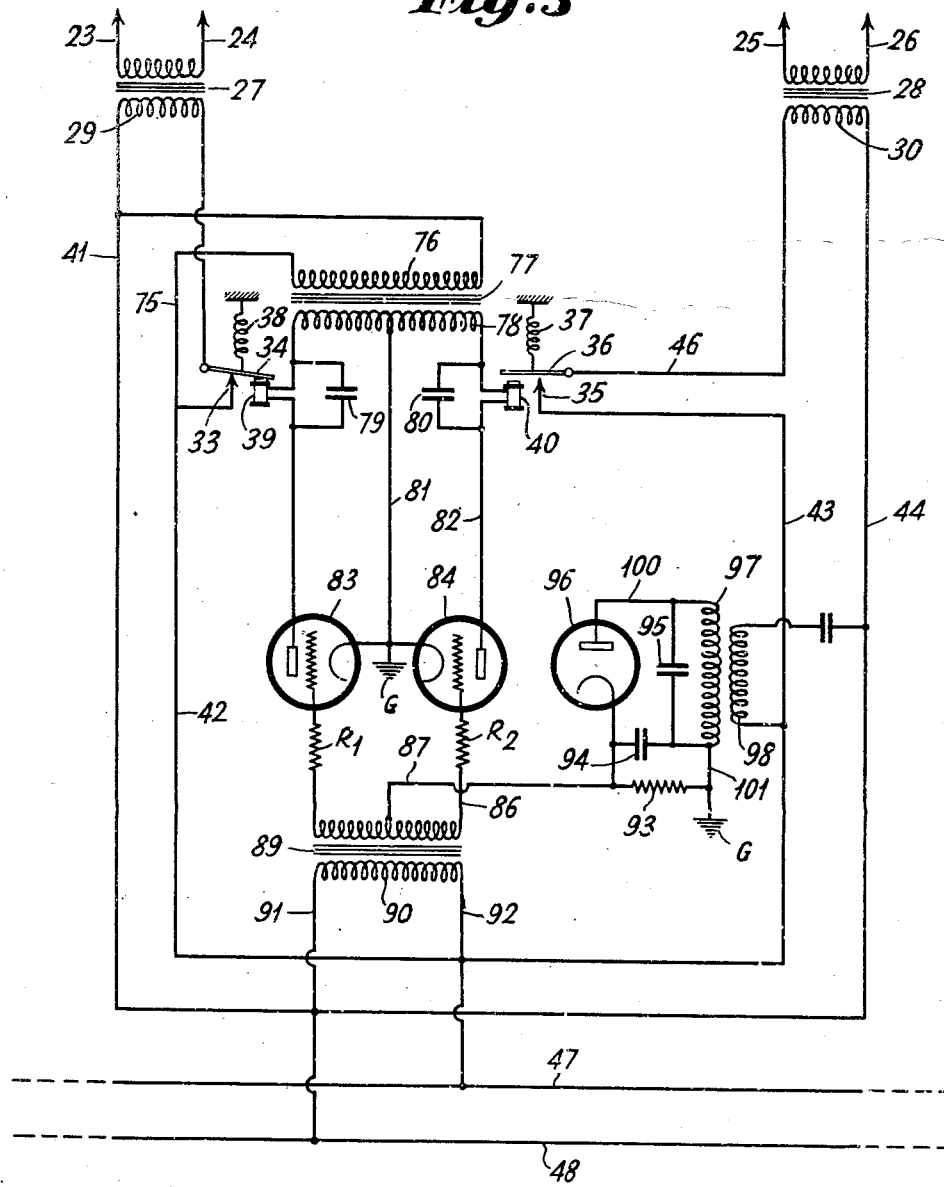

Patented June 20, 1939

2,163,411

UNITED STATES PATENT OFFICE 2,163,411

REMOTE CONTROL SYSTEM

Stuart W. Seeley, Bayside, N. Y., assignor to Radio Corporation of America, a corporation of Delaware Application October 28, 1937, Serial No. 171,486

4 Claims. (Cl. 172—239)

The present invention relates to remote control devices and more particularly to arrangements for remotely controlling the rotation of a shaft which, for instance, may be the tuning shaft of a radio receiver or the rotating means of the volume control device.

A feature of the invention is that the controlling action is obtained by producing impulses at the remote point, transmitting these impulses to the controlled point and utilizing the received impulses to operate a step by step mechanism.

A particularly important feature of a modification of the invention is that the circuit arrangements are such that no standby power is used.

Still another feature of the invention is the use of a power supply network for transmitting the controlling impulses.

Other features of the invention will be apparent from a reading of the following detailed specification in conjunction with the drawings, wherein Figure 1 illustrates in schematic form a possible arrangement of a remote control unit incorporating the features of the invention;

Figure 2 illustrates a controlled unit utilizing gas tubes; and,

Figure 3 illustrates a controlled unit utilizing ordinary electronic tubes.

Figure 1:
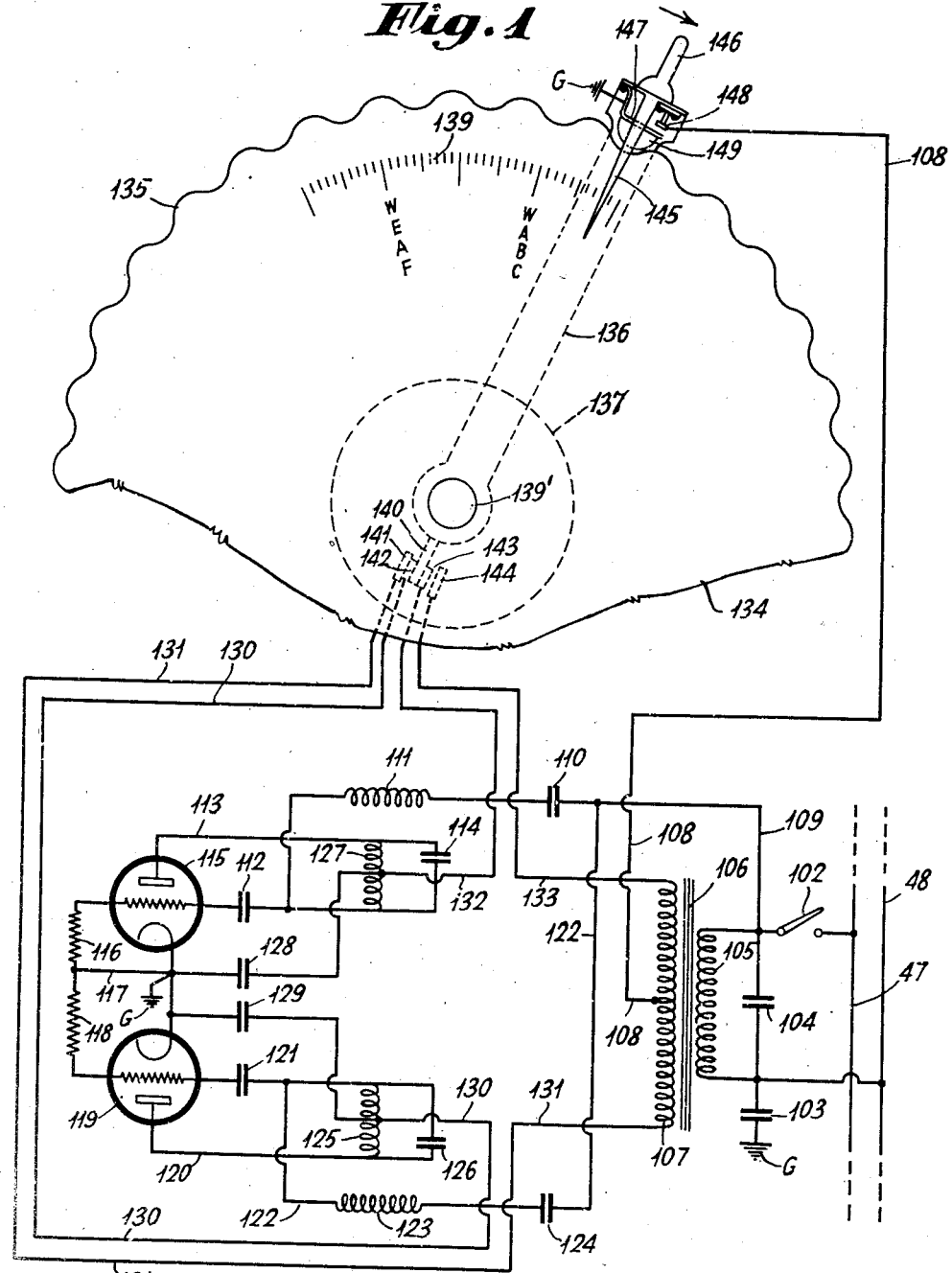

Referring to Figure 1 of the drawings, conductors 47 and 48 represent the power supply network as usually found in all buildings provided with electric light and power supply. Tubes 115 and 119 are oscillator tubes provided with input and output circuits coupled together for producing oscillations. The tank circuit or frequency determining circuit of tube 115 includes the inductance coil 127 shunted by the condenser 114 while the tank or frequency determining circuit of tube 119 comprises the inductance coil 125 shunted by the tuning condenser 126. Connection is made between the anode of tube 115 and the upper terminal of coil 127 through the conductor 113. The grid of tube 115 is connected to the lower terminal of coil 127 through a condenser 112. The output circuit of tube 115 is completed by connecting an intermediate point of coil 127 to the cathode of the tube through a condenser 128. A grid leak resistor 116 provides a direct current connection between the cathode and grid of the tube. It can be seen that due to the connection of the cathode to an intermediate point of coil 127 through the condenser 128, the anode circuit of tube 115 is regeneratively coupled to the grid circuit thereof and the degree of coupling is such that oscillations of a frequency determined by the tank circuit 127, 114 are generated when the proper potentials are applied to the various electrodes of the tube. Plate potential for the tube 115 is supplied through a power transformer 106, the secondary 107 of which is tapped at its mid point by connection thereto of a conductor 108.

In the case of tube 119 the anode thereof is connected to the lower end of coil 125 by means of a conductor 120 while the upper end of the coil is connected to the grid of the tube through a coupling condenser 121. A grid leak is provided between the grid and cathode of tube 119 by connecting between these two elements a resistor 118. The anode circuit of tube 119 is completed by means of the connection of a condenser 129 between an intermediate point of coil 125 and the cathode of the tube. It should be noted that the grid-cathode connections of both tubes 115 and 119 have a common portion 117 which is grounded as at G. The anode and grid circuits of tube 119 are coupled together as in the case of tube 115 to produce regeneration and, hence, the generation of oscillations, the frequency of which is determined by the tuning of the tank circuit 125, 126. In the case here being considered both tubes are arranged so as to generate oscillations of the same frequency. The output of tube 115 is fed to the power supply line 47—48 by means of a circuit comprising conductor 109, coil 111, condenser 110 and switch 102. Conductor 48 is connected to ground through condenser 103, so as to provide the return circuit to the cathode of tube 115. In the same way the output of tube 119 is transferred to the power supply line 47—48 through the coupling circuit comprising conductor 122, coil 123, condenser 124, conductor 109, switch 102 to the power supply line conductor 47. Here again, the return circuit is through ground by connection of the power supply line conductor 48 to ground through the condenser 103 and the connection of the cathode of tube 119 to ground.

Power supply for the tubes 115 and 119 is obtained by connecting the power transformer 106 to the power supply line 47—48. The transformer 106 comprises a primary 105 and a tapped secondary 107 which acts as a push-pull transformer in that the anodes of tubes 115 and 119 are alternately positive and negative with 180 degrees phase difference between them. Thus, when the anode of tube 115 is positive, the anode of tube 119 is necessarily negative and vice versa. Since oscillations are generated only when the anode of a particular tube is positive with respect to its cathode, the oscillations are generated alternately by the two tubes. The anode potential is supplied to the anode of tube 115 through the connection of the upper terminal of secondary 107 to the intermediate point of the coil 127. This connection is through a switch device 143—144 so that no plate voltage is supplied to the anode of tube 115 when this switch is open. In the drawing the switch is shown open. Anode potential for the tube 119 is supplied by connection of the lower terminal of secondary winding 107 to an intermediate point of the coil 125. This connection includes the conductor 131, switch elements 141 and 142 (shown closed) and conductor 130.

The operation of the switches 141—142 and 143—144 is controlled by the lever device 136. This lever device is connected to a shaft 139' which is preferably fixed, the lever device being arranged so as to rotate around said shaft. The lower end of the lever device is provided with a depending portion 140 which is constructed of suitable insulation material on which the contact elements 142 and 143 are supported and insulated from each other.

The upper end of the device 136 is provided with a turned-out and downwardly projecting portion including a pointer 145. Suitably mounted behind the pointer 145 on the lever 136 there is provided a spring switch comprising spring element 147 and contact element 148. The bias on the spring element 147 is such as to maintain the spring contact open in the absence of force. To close the contact there is provided a cam follower 149 which is mounted on the underside of the spring element 147. This cam follower is arranged so as to ride on the cam surface 135 of a disc-like device 134 fixed to the shaft 139'. It can be seen from the drawing that by grasping the knob 146 which is attached to the element 136 for providing a convenient way of rotating element 136 about the shaft 139', the switch 147—148 will be alternately closed and opened as the cam follower 149 rides over the high and low portions of the cam surface 135. The contact device 148 is connected by means of a conductor 108 to the tapped point of the secondary 107 while the switch element 147 is grounded at G. In reality the circuit including the conductor 108 and switch 147—148 comprises the cathode return circuit for the two tubes 115 and 119 so that if the switch device 147—148 is open no anode voltage is supplied to either one of the tubes irrespective of the condition of switches 141—142 and 143—144. Switch elements 141 and 144 are fixed to the surface of a disc 137 which is also rotatably supported by the shaft 139' adjacent to the device 136. The arrangement is such that when a force is applied to handle 146 so as to turn the device 136 clockwise, a certain amount of free motion is provided between device 136 and disc 137 until the contact device 142 comes in contact with the switch element 141. When this happens further clockwise movement of 136 carries with it the disc 137 in the same direction.

It follows at once that if a force is applied to the handle 146 tending to rotate the device 136 counter-clockwise, the depending portion 140 will move over counter-clockwise until contact 143 comes in contact with 144 at which time further counter-clockwise movement of device 136 carries with it the disc 137 thereby rotating it in a counter-clockwise direction. The device provides an arrangement for energizing either tube 115 or tube 119 in accordance with the direction in which the lever device 136 is operated. Thus, if lever 136 is operated in a clockwise direction closure of switch 141—142 completes the circuit between the lower terminal of the secondary 107 and the intermediate point of coil 125. However, this alone is not sufficient to energize the tube 119 since it is also necessary to have a return circuit from the cathode of the tube to the midpoint of secondary 107. This return circuit is established only upon closure of switch 147—148. In this way oscillations are generated by the tube 119 only when the lever device 136 is moved in a clockwise direction, the number of impulses depends upon the number of times the cam follower 149 rides over a high portion of the cam surface 135. Thus by movement of lever device 136 clockwise a series of impulses are generated by tube 119, the number of these series being determined by the number of high portions of the cam surface 135 traversed in moving the lever device from the starting position to the stopping position. It is, of course, apparent that movement of the lever device 136 counter-clockwise will cause oscillations to be generated by the tube 115 and its associated circuits and the number of impulses thereof is determined by the travel of the lever 136. The cam device 134 is provided with suitable markings 139, the purpose of which will be described in connection with the operation of the device.

From what precedes, it can be seen that impulses of oscillations of the desired frequency are transferred to the power line 47, 48 by movement of the lever 136. Due to the arrangement of the power transformer 106, the impulses provided by tube 115 are 180° out of phase with the impulses provided by the tube 119. The impulses impressed upon the power supply line 47, 48 are the controlling impulses which are utilized at the controlled point to operate the step by step mechanism.

Considering the remote control unit in another way, it will be seen that the oscillations generated by the tubes 115 and 119 may be considered as being modulated by the 60 cycle alternating current available across the power supply lines 47 and 48 when such is provided by the power supply network. This modulation is due to the rise and fall as well as the reversal of the 60 cycle potentials applied to the anodes of the oscillator tubes. The modulation components so produced contain a predominant 60 cycle characteristic. It, therefore, may be considered that movement of the lever device 136 in one direction as compared to movement thereof in the other direction produces a 180° phase change in the 60 cycle modulation component of the oscillations put on to the power supply network. To take advantage of the phase change, there are provided two controlled circuits at the controlled point of the network, each of which incorporates a three element gas tube of the type described in copending application Serial No. 151,821, filed July 3, 1937. In said copending application tubes of this type are shown at 24 and 34 of Figure 2.

Referring to Figure 2 of the present application, the step by step mechanism comprises a pair of discs 3 and 4 which are keyed or other suitably fixed to the controlled shaft 2. The discs 3 and 4 are provided with suitable ratchet teeth 32 and 31 respectively arranged in opposite directions as shown. The discs 3 and 4 are rotated by operating the plungers 8 and 7 respectively. These plungers are provided with suitable catch mechanisms 10 and 9 which are pivoted respectively at 16 and 15. The catch mechanism 10 is pivotally supported by pin 16 within a slot 22 formed near the upper end of the plunger device 8. The lower end of the catch device 14 is provided with a slot 18 which is adapted to receive a pin 19 mounted within the slot 22 so as to limit the movement of the catch device. A spring 11 biases the catch device 14 so as to tend to rotate the device about its pivot 16 in a clockwise manner. The plunger 8 is operated by means of an electromagnet 6 which is connected through conductors 25 and 26 and transformer 28 to the power supply circuit 47, 48.

It should be noted that the primary 30 of transformer 28 has one side connected to power supply conductor 48 through conductor 44 while the other side of the primary 30 is connected to the power supply conductor 47 by means of a switch 35—36 and conductors 43 and 40. In this way no operating current is supplied to the primary 30 of transformer 28 unless the switch 35, 36 is closed. The electromagnet and plunger arrangement 6 and 8 is arranged so that when the electromagnet 6 is energized the plunger 8 is pulled downwardly, thereby advancing the disc 3 a predetermined amount clockwise. Suitable stops, (not shown) are provided so as to limit the motion of plunger 8 in either direction. The plunger 8 is biased by a suitable spring (not shown) so that when the electromagnet 6 is de-energized, as when switch 35—36 is open, the spring acts to return the plunger 8 to its normal released position which is that shown. In the same way the plunger 7 is operated by the electromagnet 5 through connection thereof to the power supply line 47, 48 through transformer 27 and switch 33—34. However, in this case the operation of the plunger 7 operates the disc 4 and thereby turns shaft 2 in the opposite direction, that is, counter-clockwise.

It should be noted that when the plungers 7 and 8 are in the released position, that is, when the operating electromagnets 5 and 6 are de-energized, the catches 13 and 14 are forced into their respective slots 21 and 22 by means of projections 150 and 151 over which the outer edge of the catches 13 and 14 respectively must ride. The purpose of the stops is to prevent locking the wheels 4 and 3 when the electromagnets 5 and 6 are deenergized. Projections 150 and 151 are suitable mounted on the framework of the unit (not shown).

The switch 33—34 is operated by means of a relay winding 39 which is controlled by a three element gas tube 60. Switch 35, 36 on the other hand, is controlled by relay winding 40 which in turn is controlled by the three element gas tube 61. Gas tubes such as 60 and 61 have been described more fully in my said copending application and as a matter of fact, tubes 60 and 61 are connected to the power supply network 47 and 48 in the same manner as the connections of tubes 24 and 34 to the network 1 and 2 of my said copending application. Since the output of either tube 115 or tube 119 (see Figure 1) is impressed upon the power supply network 47, 48 at the remote point it travels through the network and may be received at the controlled point. The tubes 60 and 61 are connected to the network in such a way that one of these tubes operates when the lever device 136 is moved in one direction and the other of the three element gas tubes operates when the lever device 136 is moved in the opposite direction in a manner as described in my said copending application. As a conse-quence, the impulses transmitted through the power supply network from the remote point cause the operation of either relay 39 or relay 40, depending upon which way the lever device is rotated. Since the make and break device 147—148 causes impulses to be transmitted over the line, either relay 39 or relay 40 will operate every time an impulse is received thereby energizing either electromagnet 5 or electromagnet 6 causing either plunger 7 or plunger 8 to operate and thereby rotating the shaft step by step in one direction or the other.

As shown in Figure 2, the relay winding 39 is energized so that the switch element 34 is connected to the contactor 33. This in turn permits alternating current from the power supply network to energize electromagnet 5, thus pulling down plunger 7 and turning disc 4 and hence shaft 2 counter-clockwise. As soon as the impulse ceases, spring 32 will break the contact between elements 33 and 34, thereby deenergizing electromagnet 5 and allowing the returning spring (not shown) to return the plunger 7 to its original released position corresponding to the position of plunger 8. If as in Figure 1, the dial 139 is calibrated so that the markings correspond to various transmitting stations, it can be seen that the device can be utilized as a remote tuning instrumentality by connection of the rotors of a gang condenser unit 1—1' to the shaft 2. Of course, any other devices such as a volume control device or a step switch could be connected in the place of the gang condenser unit so as to be operated by rotation of the shaft 2.

The arrangement shown in Figure 2 due to the use of gas tubes has the advantage that no power is used during standby periods. Thus, in tuning a radio, for instance, it is only necessary to plug in a control device such as shown in Figure 1 into the power supply network, close the switch 102 and then operate the lever device 136 to tune to any desired station. Tubes 60 and 61, as described in my said copending application, are always ready to operate when the controlled unit is connected to a power line, even though no power is being utilized by them until the receipt of the proper controlling impulse. It may be sometimes desirable to utilize ordinary electronic tubes at the controlled point. In such a case standby power may also be zero if a gas tube controlled from the remote point is used to connect these tubes to the power supply line in the manner described in my said copending application. In such a system no standby power is used by the electronic tubes until a controlling impulse operates the gas tube and thereby connects these electronic tubes to the power supply line by operating a switch in the same manner as described in my said copending application, it being noted, for instance, that a device such as shown in Figure 3 may be connected to the power supply lines through a terminal 29 shown in Figure 2 of my said copending application.

Referring now to Figure 3 of the present application, the transformers 27 and 28 are the same as transformers 27 and 28 shown in Figure 2 and these act to energize the electromagnets 5 and 6 and, hence, operate the shaft 2. Everything above the transformers 27 and 28 has been omitted in order to simplify the discussion but it is to be understood that a similar arrangement as shown in Figure 2 may be connected. The arrangement of the tubes 83, 84 and 96 in Figure 3 is essentially the same as the arrangement of tubes 20 and 23 of Figure 1 of my copending application Serial No. 168,180 filed October 9, 1937, so that the arrangement including tubes 83 and 84 acts as a phase detector circuit in that the excitation of either tube 83 or tube 84 depends upon the phase of the incoming envelope of the radio frequency voltage which is transmitted from the remote point by means of the arrangement shown in Figure 1. Alternating current is impressed on the two anodes of tubes 83 and 84 in push-pull from a center tap power transformer 77. Sensitive low current relays 39 and 40 which operate switches 33—34 and 35—36 respectively are connected in the anode circuits of the two tubes 83 and 84. 60 cycle alternating current voltage is also supplied to the control grids of tubes 83 and 84 in push-pull through the transformer 89 and the magnitude and phase of this voltage is so arranged as to maintain the two tubes in an inoperative condition, that is, no plate current flows in either tube. The purpose of resistors R1 and R2 is to cause self-rectification during the positive excursions of the A. C. grid voltage with respect to cathode in the tubes. The resistors limit the flow of grid current which otherwise would be abnormal when the grid is positive and the plate negative with respect to the cathode. The radio frequency impulses are utilized in the following manner:

Radio frequency is taken from the line 43, 44 which in turn is connected to the network 47, 48 through circuit 98—99 which constitutes a coupling coil and condenser arrangement. The condenser acts to block out the 60 cycle line voltage. The radio frequency voltage is transferred to coil 97 and is increased in amplitude by resonant rise in circuit 95, 97 which is resonated at the carrier frequency generated at the remote point. The envelope of the radio frequency voltage is thus extracted by means of the detector tube 96 as described in my copending application Serial No. 168,180 and the envelope appears across resistor 93. Since this resistor is in the common portion of the push-pull input circuit of tubes 83 and 84 the envelope voltage is applied to the two grids of tubes 83 and 84 in parallel, that is, in like manner. Which one of the tubes 83, 84 passes anode current is determined by the phase relation between the alternating current plate potential as applied through transformer 77 and the radio frequency envelope. That one of the tubes 83 and 84, whose plate is at its peak positive value with respect to cathode will pass current when the radio frequency envelope is similarly at its peak positive value wtih respect to cathode. Reversal of the phase of the envelope will cause the other tube to pass plate current. In order to prevent chattering of the relays 39 and 30 by-pass condenser 79 and 80 are provided to thereby by-pass the alternating current component of the anode current of the tubes. Springs 37 and 38 are attached to the framework at one end thereof and to the movable elements 36 and 46 of the relays in order to maintain the switches open when the relays are deenergized.

It is to be understood that the present invention is not to be limited to the embodiment illustrated, but is to be limited only by the appended claims.

I claim:

1. In a system for controlling the operation of a shaft from a remote point by means of a step by step mechanism which is arranged to be responsive to electrical impulses, an electrical circuit connected between the remote point and the control point, means at the remote point for generating oscillations including a selectively operable interrupting device, said means acting upon selective operation to produce electrical impulses, means for impressing the produced electrical impulses upon the electrical circuit to transmit the same to the controlled point, a relay circuit at the controlled point for operating the step by step mechanism, said relay circuit including a gas tube permanently connected to the electrical circuit and acting upon receipt of the transmitted impulses at the controlled point to cause the energization of the relay with each received impulse and thereby operate the step by step mechanism.

2. In a remote control system including a relay operated step by step mechanism, arranged to be controlled over an electric light and power supply line from a point along the line which is remote therefrom, a gas tube connected across the supply line, said gas tube being characterized by that the supply line potential normally applied across it is insufficient to cause the same to break down and pass current, means for connecting said relay to the gas tube whereby the relay is energized by current passing through the tube, a controlling means coupled to the line at the remote point and comprising oscillation generating means and a selectively operable interrupting means, said controlling means acting upon selective operation thereof to produce electrical impulses, means for impressing the produced electrical impulses upon the supply line whereby they are impressed upon the gas tube, said electrical impulses causing potentials to be applied to the gas tube which cause the tube to break down and thereby energize the relay each time an impulse is impressed upon the power supply line.

3. In a remote control system operation over an alternating current power supply line said system being of the type utilizing a step by step mechanism which is operated by an electric driving means, switching means for connecting the driving means to the power supply line to energize the same, relay means for operating said switching means, a gas tube connected to the power supply line, means for applying a potential derived from the power supply line to the tube, said potential being insufficient to cause the tube to break down and pass current, means for connecting the relay means to the gas tube so that when the tube breaks down and passes current the relay means becomes energized thereby operating the switching means and thereby connect the driving means to the power supply line, a controlling means adapted to be connected to the power supply line, said controlling means including selectively operable means for generating radio frequency electric control impulses, means for impressing the generated impulses upon the power supply line whereby the same are impressed upon said gas tube, said impulses causing potentials to be impressed upon the gas tube which when added to the potential normally applied thereto cause the tube to break down and pass current with each impressed impulse.

4. In a remote control system operative over an electric light and power supply line, a pair of electrical driving means, individual switching means for connecting the driving means to the power supply line to energize the same, means for controlling the operation of one of said switching means comprising a first gas tube connected across the power supply line and arranged to derive from the power supply line a potential which is slightly below the potential necessary to cause the tube to break down and pass current, a second gas tube similarly connected to the power supply line and arranged to control the operation of the other switching means, means for coupling said last named means to the power supply line including a selectively operable interrupting device acting upon selective operation to determine the frequency of the generated oscillations and the number of impulses thereof impressed upon the power supply circuit and means interposed between the power supply circuit and the first gas tube for impressing upon the first gas tube impulses impressed upon the power supply line of one of said frequencies whereby the potential of said impulses is added to the normal power supply line potential applied to the first tube to cause the same to break down and pass current and means interposed between the power supply line and the second gas tube for applying to the second gas tube impulses of another of said frequencies whereby the potential of said impulses is added with the normal power supply line potential applied to said tube to cause the same to break down and pass current.

STUART W. SEELEY.